United States Patent
Park

(10) Patent No.: US 9,660,552 B2
(45) Date of Patent: May 23, 2017

(54) APPARATUS FOR CONTROLLING PARALLELED INVERTER

(71) Applicant: LSIS CO., LTD., Anyang-si, Gyeonggi-do (KR)

(72) Inventor: Jong Je Park, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 64 days.

(21) Appl. No.: 14/539,839

(22) Filed: Nov. 12, 2014

(65) Prior Publication Data

US 2015/0138855 A1    May 21, 2015

(30) Foreign Application Priority Data

Nov. 19, 2013  (KR) .................. 10-2013-0140305

(51) Int. Cl.
  *H02M 7/42*    (2006.01)
  *H02M 7/49*    (2007.01)
  *H02M 7/493*   (2007.01)

(52) U.S. Cl.
  CPC ............ *H02M 7/42* (2013.01); *H02M 7/49* (2013.01); *H02M 7/493* (2013.01)

(58) Field of Classification Search
  CPC ...................................................... H02M 7/42
  See application file for complete search history.

(56) References Cited

U.S. PATENT DOCUMENTS

| 5,132,893 | A | * | 7/1992 | Klein | ...................... | G05F 1/563 |
|---|---|---|---|---|---|---|
|  |  |  |  |  |  | 323/901 |
| 5,193,054 | A | * | 3/1993 | Galloway | ................. | H02J 4/00 |
|  |  |  |  |  |  | 307/82 |
| 5,225,712 | A | * | 7/1993 | Erdman | ................ | F03D 7/0272 |
|  |  |  |  |  |  | 290/44 |
| 5,914,866 | A | * | 6/1999 | Eguchi | ................ | H02M 7/4807 |
|  |  |  |  |  |  | 363/131 |
| 2004/0008530 | A1 | * | 1/2004 | Kitahata | ............... | H02M 5/458 |
|  |  |  |  |  |  | 363/131 |
| 2005/0067984 | A1 | * | 3/2005 | Makinen | ............. | H02P 23/0004 |
|  |  |  |  |  |  | 318/78 |
| 2006/0138993 | A1 | * | 6/2006 | Gandrud | ............... | B60L 11/005 |
|  |  |  |  |  |  | 318/727 |

(Continued)

FOREIGN PATENT DOCUMENTS

| CN | 101262178 | 9/2008 |
|---|---|---|
| CN | 201467063 | 5/2010 |

(Continued)

OTHER PUBLICATIONS

Kumar, et al., "Bus Paralleling Controller with CAN Interface for High Power Converter Modules," Sustainable Energy Technologies (ICSET), 2010 IEEE International Conference, XP031846920, Dec. 2010, 5 pages.

(Continued)

*Primary Examiner* — Timothy J Dole
*Assistant Examiner* — Yusef Ahmed
(74) *Attorney, Agent, or Firm* — Lee, Hong, Degerman, Kang & Waimey

(57) ABSTRACT

An apparatus for controlling paralleled inverter is disclosed. In the apparatus for controlling paralleled inverter, one synchronization signal is shaped by at least two inverters to respectively transmit a voltage command and an operation command.

5 Claims, 6 Drawing Sheets

(56) References Cited

U.S. PATENT DOCUMENTS

| | | | | |
|---|---|---|---|---|
| 2008/0218320 | A1* | 9/2008 | Jang | H02M 7/49 363/1 |
| 2009/0109713 | A1* | 4/2009 | Schnetzka | H02M 7/003 363/34 |
| 2009/0115355 | A1* | 5/2009 | Oyobe | H02M 7/493 318/34 |
| 2010/0065349 | A1* | 3/2010 | Ichikawa | B60L 3/0046 180/65.1 |
| 2010/0118569 | A1* | 5/2010 | Kono | H02M 7/53871 363/34 |
| 2010/0142234 | A1* | 6/2010 | Abolhassani | H02M 7/49 363/41 |
| 2010/0292853 | A1* | 11/2010 | Mcdonnell | H02J 3/34 700/287 |
| 2010/0328848 | A1* | 12/2010 | Ledezma | H02P 27/14 361/603 |
| 2010/0328883 | A1* | 12/2010 | Ledezma | H02M 7/003 361/690 |
| 2011/0044010 | A1* | 2/2011 | Ledezma | H02M 7/003 361/727 |
| 2011/0080125 | A1* | 4/2011 | Shimada | H02P 5/74 318/400.09 |
| 2011/0215890 | A1* | 9/2011 | Abolhassani | H01F 7/06 336/60 |
| 2012/0013283 | A1* | 1/2012 | Tallam | H02M 5/4585 318/400.26 |
| 2012/0014147 | A1* | 1/2012 | Radosevich | H02M 1/0845 363/71 |
| 2012/0086369 | A1* | 4/2012 | Kitanaka | B60L 7/16 318/139 |
| 2012/0127673 | A1* | 5/2012 | Ledezma | H02M 7/003 361/730 |
| 2012/0134184 | A1* | 5/2012 | Park | H02M 7/49 363/37 |
| 2012/0327602 | A1* | 12/2012 | Kulkarni | H02M 7/003 361/700 |
| 2012/0331195 | A1* | 12/2012 | Pipho | G06F 13/364 710/110 |
| 2013/0128628 | A1* | 5/2013 | Venhaus | H02M 7/49 363/34 |
| 2013/0141952 | A1* | 6/2013 | Kaneko | H02M 7/537 363/72 |
| 2013/0234641 | A1* | 9/2013 | Li | H02P 27/08 318/503 |
| 2015/0003015 | A1* | 1/2015 | Kulkarni | H05K 7/1432 361/700 |
| 2015/0022135 | A1* | 1/2015 | Yun | H02P 27/06 318/500 |
| 2015/0092462 | A1* | 4/2015 | Ohori | H02M 7/44 363/71 |
| 2015/0241896 | A1* | 8/2015 | Nishibayashi | G05B 15/02 700/286 |
| 2015/0280546 | A1* | 10/2015 | Kouno | H02M 1/36 363/132 |

FOREIGN PATENT DOCUMENTS

| | | |
|---|---|---|
| CN | 102355195 | 2/2012 |
| CN | 203275995 | 11/2013 |
| JP | 2000-513560 | 10/2000 |
| JP | 2002-345252 | 11/2002 |
| JP | 2006-333625 | 12/2006 |
| JP | 2008-086127 | 4/2008 |
| JP | 2011-147334 | 7/2011 |
| KR | 10-0738571 | 7/2007 |
| KR | 10-2013-0058344 | 6/2013 |
| WO | 2012/061055 | 5/2012 |

OTHER PUBLICATIONS

European Patent Office Application Serial No. 14193452.1 Search Report dated Sep. 2, 2015, 6 pages.
Fukuda, et al., "A Control Method for Parallel-Connected Multiple Inverter Systems," Power Electronics and Variable Speed Drives, Conference Publication No. 456, Sep. 1998, pp. 175-180.
Korean Intellectual Property Office Application Serial No. 10-2013-0140305, Office Action dated Sep. 29, 2014, 4 pages.
Japan Patent Office Application Serial No. 2014-234572, Office Action dated Feb. 2, 2016, 3 pages.
The State Intellectual Property Office of the People's Republic of China Application No. 201410783851.8, Office Action dated Sep. 1, 2016, 8 pages.

\* cited by examiner

APPARATUS FOR CONTROLLING PARALLELED INVERTER

CROSS-REFERENCE TO RELATED APPLICATIONS

Pursuant to 35 U.S.C. §119(a), this application claims the benefit of earlier filing date and right of priority to Korean Patent Application No. 10-2013-0140305, filed on Nov. 19, 2013, the contents of which are all hereby incorporated by reference herein in its entirety.

BACKGROUND

Field of the Disclosure

The teachings in accordance with the exemplary embodiments of this present disclosure generally relate to an apparatus for controlling paralleled inverter.

Description of Related Art

In general, methods of using an inverter by expanding capacity of the inverter include a method in which a new product is designed by expanding voltage and current capacity of power elements, and a method of design in which already developed products are configured in parallel. There is a limit in developing a large capacity of inverter due to limited voltage and current capacity in power elements for industrial inverters, and paralleled inverters have been recently designed to overcome the disadvantage of prior art.

An accurate adjustment of synchronization at the output voltage is the key factor for paralleled inverters, and to this end, various technologies have been developed. In general, operation of a paralleled inverter is performed by one master controller and a plurality of slave controllers.

FIG. 1 is a block diagram illustrating a system of a paralleled inverter according to prior art, where a controller (100) in a conventional paralleled inverter system includes a master controller (110) and a slave controller (120). The slave controller (120) operates as a slave in a parallel operation, but operates as a master controller when an inverter B (320) is independently operated.

It is most important in the paralleled inverter to control a voltage at an output terminal on a same size and phase, and a paralleled reactor is used at an output terminal to prevent a circulating current from being generated by errors in size and phase. A coupled reactor (410) is used for a medium voltage inverter to avoid a problem of output voltage drop caused by installation of reactor.

In the inverter system of FIG. 1, each controller (110, 120) controls corresponding inverter A (200) and inverter B (300) for operation of unit inverter, but the master controller (110) in a paralleled operation controls an entire system and communicates with the slave controller (120) at all times. The master controller (110) transmits a synchronization signal to the slave controller (120) for output voltage synchronization.

FIG. 2 is an exemplary view illustrating a synchronization signal transmitted to the slave controller (120) by the master controller (110) of FIG. 1 and pulse width modulation (PWM) carriers of an inverter A and an inverter B thereof.

The synchronization signal transmitted by the master controller (110) is received by the slave controller (120), where the slave controller (120) resets a PWM carrier counter for adjustment of synchronization.

A 6600V multilevel medium voltage inverter includes power cells (200, 300) which are 18 single phase inverters in one inverter. Each power cell is operated through receipt of various pieces of information (size and phase of command, operation command, etc) by cell controllers (210, 310) from the controller (100).

However, the system of FIG. 1 requires hardware interface for transmission and receipt of synchronization signals between the master controller (110) and the slave controllers (120) for output voltage synchronization. This method of hardware interface is almost similar to the PWM synchronization, but there is a disadvantage of generating a signal delay on a circuit and of being influenced by noise generated from surrounding circuits.

Meanwhile, although synchronization may be performed by software synchronous algorithm, there is another disadvantage of generating a synchronization error as much as control period of CPU.

SUMMARY OF THE DISCLOSURE

The present disclosure is to provide an apparatus for controlling paralleled inverter configured to perform a synchronization operation using one controller in a paralleled medium voltage inverter to obtain reliability for inverter control.

In one general aspect of the present disclosure, there may be provided an apparatus for controlling paralleled inverter configured to control at least two paralleled inverters, the apparatus comprising: a controller configured to respectively transmit operation information to at least two inverters by one synchronization signal; a detection unit configured to respectively detect output currents of at least two inverters; and at least two interface units configured to respectively transmit the operation information of the controller to the at least two inverters.

In some exemplary embodiment of the present invention, the controller may be further configured to correct the operation information by performing a proportional integral (PI) control with an error of output currents of the at least two inverters.

In some exemplary embodiment of the present invention, the operation information may include a voltage command and an operation command.

In some exemplary embodiment of the present invention, the controller may transmit the operation information to the at least two interface units using a predetermined communication type.

In some exemplary embodiment of the present invention, the predetermined communication type may include a controller area network (CAN).

In some exemplary embodiment of the present invention, each interface unit may transmit an optical signal to the inverter by converting an electric signal transmitted from the controller to the optical signal, and transmits an electric signal to the controller by converting the optical signal received from the inverter to the electric signal.

In some exemplary embodiment of the present invention, each inverter may include: a plurality of cell controllers configured to generate a PWM signal in response to the operation information; and a plurality of power cells, each connected to each of the plurality of cell controllers, to generate a voltage provided to a motor in response to the PWM signal.

In some exemplary embodiment of the present invention, the cell controller may transmit data from the power cell to the controller.

In some exemplary embodiment of the present invention, the data from the power cell may include an output current of the power cell, a DC-link voltage and trip information.

ADVANTAGEOUS EFFECT OF THE DISCLOSURE

The exemplary embodiments of this present disclosure has an advantageous effect in that a paralleled operation for a plurality of inverters is possible free from a separate hardware that exchanges synchronization signals by using one master controller. Another advantageous effect is that a circulating current that may be generated during paralleled operation can be reduced by minimizing a current error.

DETAILED DESCRIPTION OF THE DISCLOSURE

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Hereinafter, exemplary embodiments of the present disclosure will be described in detail with reference to the accompanying drawings.

Figure 1:
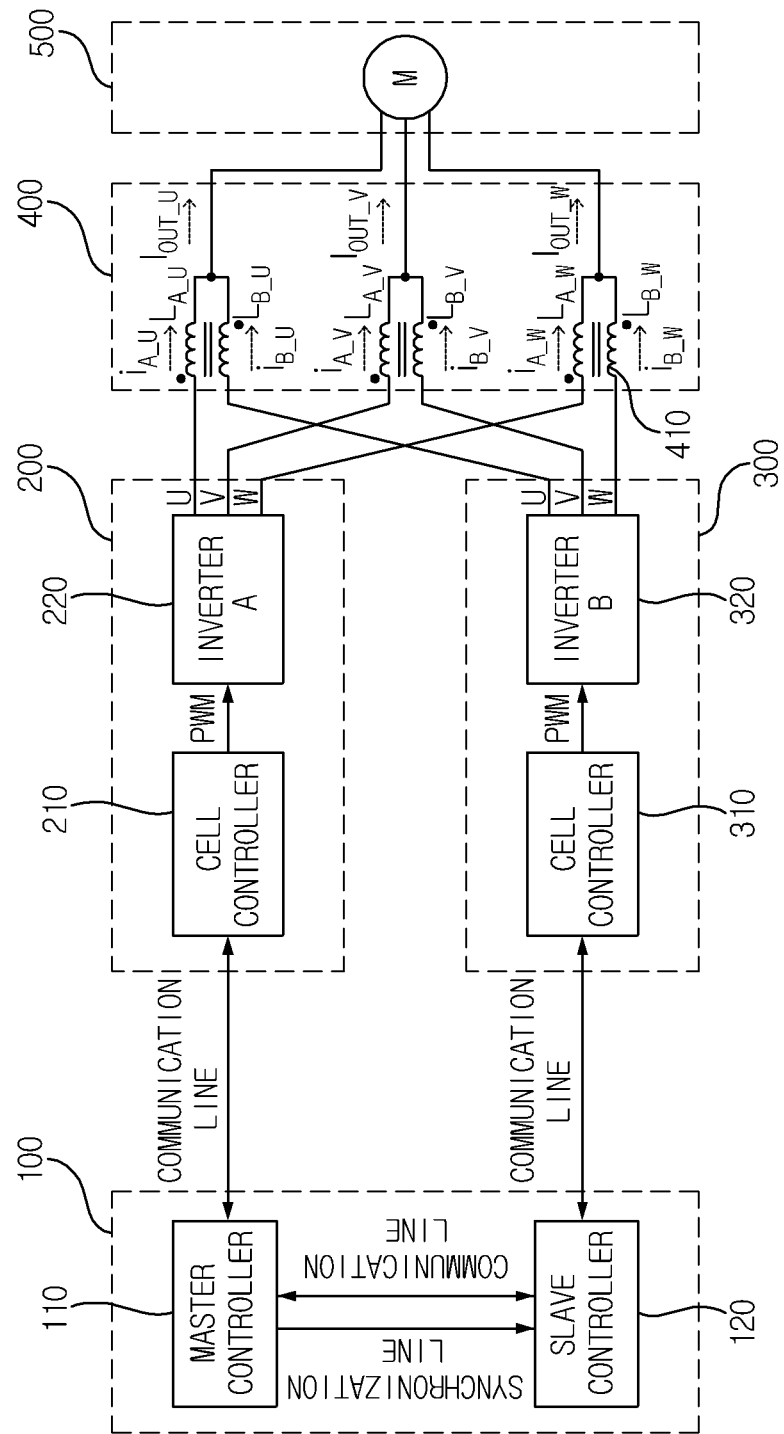
FIG. 1 is a block diagram illustrating a paralleled inverter system according to prior art.
Figure 2:
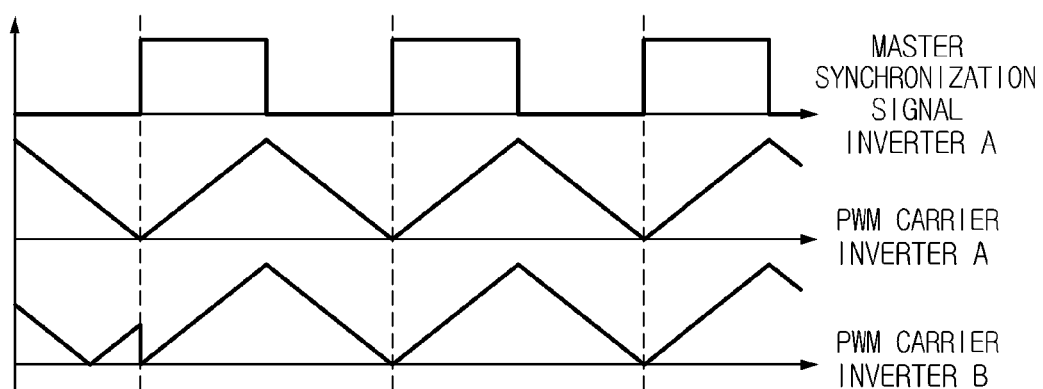
FIG. 2 is an exemplary view illustrating a PWM synchronization of FIG. 1.
Figure 3:
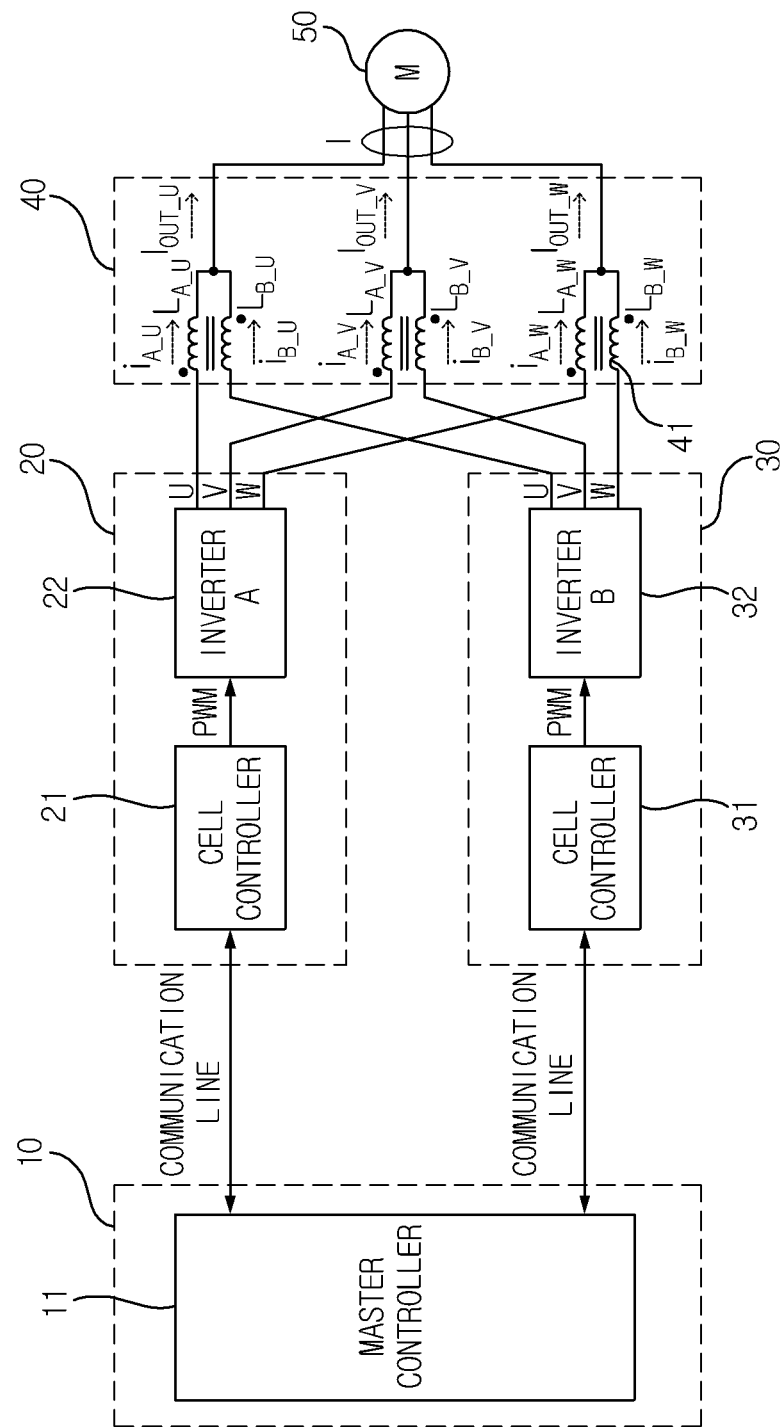
FIG. 3 is schematic block diagram illustrating a paralleled inverter system according to an exemplary embodiment of the present disclosure.

FIG. 3 is schematic block diagram illustrating a paralleled inverter system according to an exemplary embodiment of the present disclosure.

Referring to FIG. 3, the paralleled inverter system according to an exemplary embodiment of the present disclosure can control an inverter A (20) and an inverter B (30) in response to a single control apparatus (10). An output of parallel-connected inverter A (20) and inverter B (30) may be transmitted to a motor (50) to drive the motor (50).

A reactor (40) may be arranged between an output terminal of the inverters (20, 30) and an output terminal of the motor (50) to prevent a circulating current generated by errors in sizes and phases of the inverters (20, 30). A multilevel medium voltage inverter may be arranged in parallel with a coupled reactor (41) to avoid a problem of output voltage drop caused by installation of the reactor (40).

Figure 4:
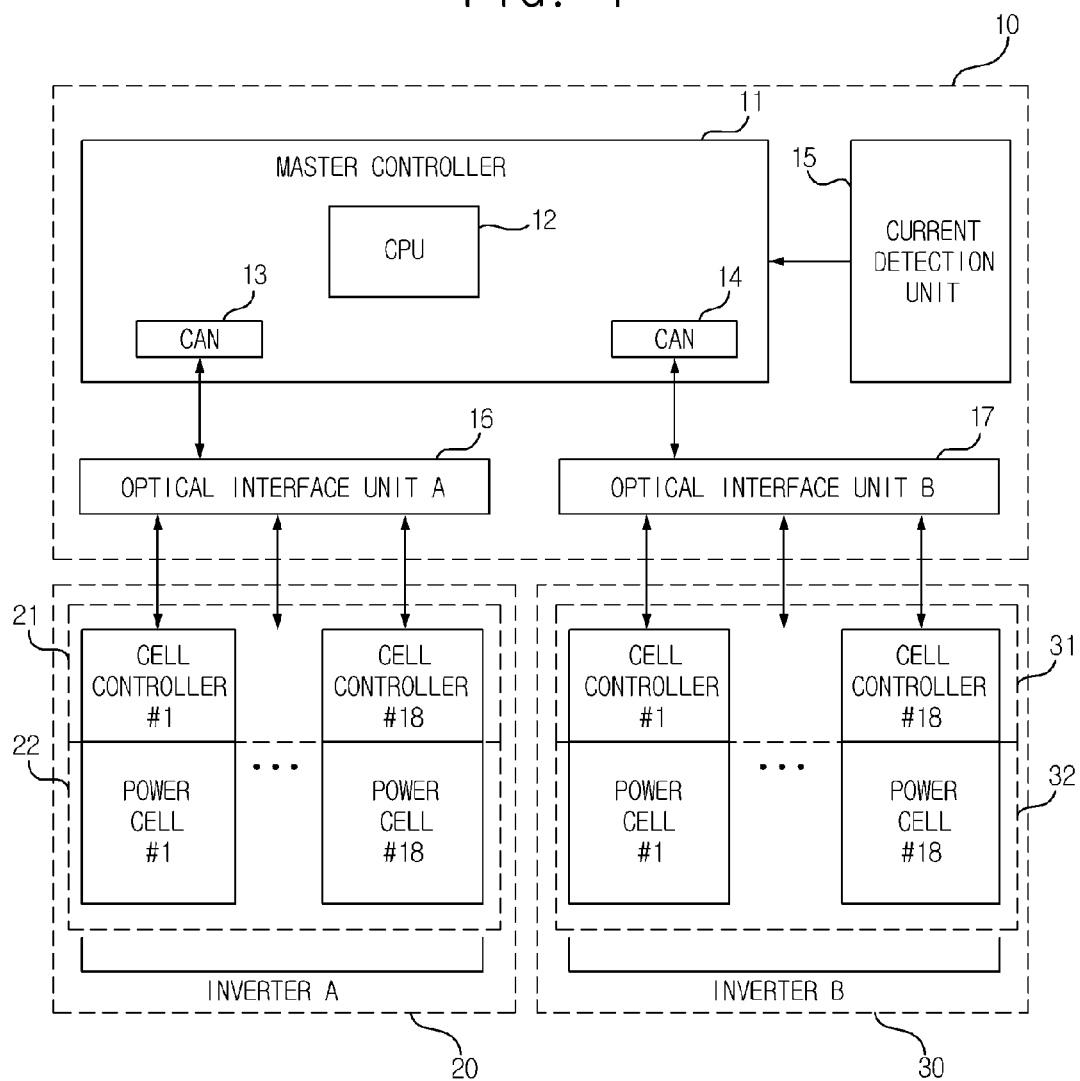
FIG. 4 is an exemplary view illustrating in detail a master controller and an inverter of FIG. 3.

FIG. 4 is an exemplary view illustrating in detail a master controller and an inverter of FIG. 3.

Referring to FIG. 4, an apparatus for controlling paralleled inverter (10, hereinafter referred to as 'apparatus') may include a master controller (11), a current detection unit (15) and optical interface units (16, 17). The master controller (11) may include a CPU (12, Central Processing Unit) and CAN (Controller Area Network) communication units (13, 14). The inverters A, B (20, 30) may be comprised of a plurality of power cells (22, 32), and each power cell (22, 32) may be controlled by cell controllers (21, 31).

The inverters A, B (20, 30) can communicate at all times with the master controller (11) via CAN communication free from a separate synchronization line. However, the communication method is exemplary and the present disclosure is not limited to the communication method by the inverters A, B (20, 30) via CAN communication, and may be applied with various communication methods.

When the inverters A, B (20, 30) receive operation information (i.e., size, phase of command voltage, and operation command) from the master controller (11), each cell controller (21, 31) can output PWM waveforms through internal computation.

Furthermore, the cell controllers (21, 31) may transmit various data (output current of the power cell, a DC-link voltage and trip information) collected by the cells to the master controller (11) at every period. The master controller (11) may perform functions necessary for parallel operation by consolidating information received from the cell controllers (21, 31).

Each power cell (22, 32) may be connected to the master controller (11) via an optical cable to perform the CAN communication. The CAN communication unit (13, 14) may receive and transmit data between the CPU (12) and the inverters A, B (20, 30), may convert the data for CAN communication transmitted from the master controller (11) to the inverters A, B (20, 30) to an optical signal, and may convert the optical signal transmitted from the inverters A, B (20, 30) to the master controller (11) for CAN communication to an electric signal.

Although a conventional paralleled inverter transmits a synchronization signal from a master controller (110) to a slave controller (120) for PWM synchronization using a separate synchronization line, and is synchronized with the master controller (110) using the synchronization signal received from the slave controller (120), the present disclosure can simultaneously transmit size and phase of a command voltage to the cell controllers (21, 31) by sharing one synchronization signal at the CAN communication units (13, 14) free from a separate synchronization line because of using a single master controller (11). The cell controller (11) can synchronize by resetting a PWM counter of the inverter B (30) using a synchronization signal received via the optical cable.

Figure 5:
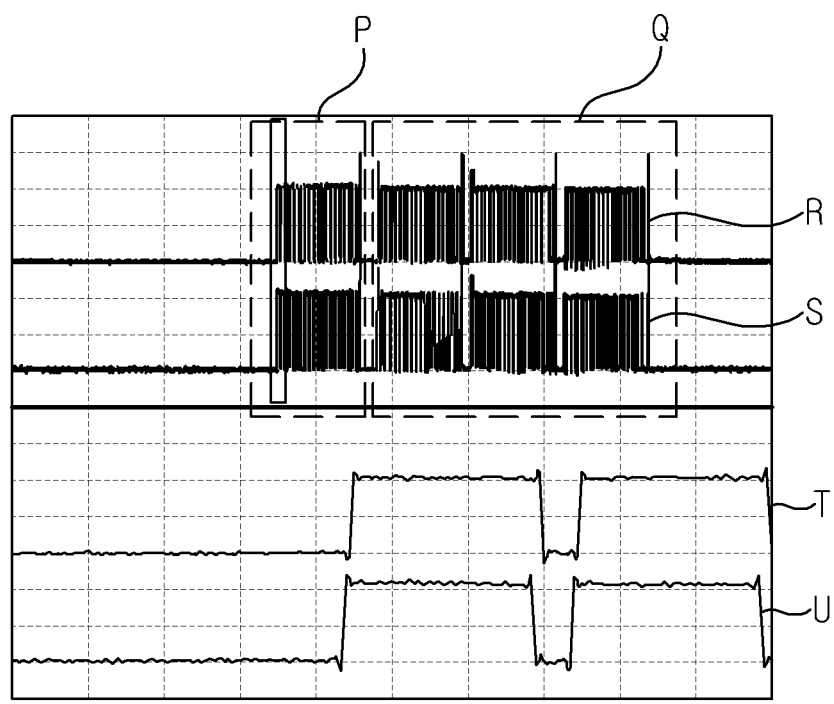
FIG. 5 is an exemplary view illustrating and explaining a synchronization signal transmitted from a master controller to each inverter according to the present disclosure.

FIG. 5 is an exemplary view illustrating and explaining a synchronization signal transmitted from a master controller to each inverter according to the present disclosure.

Referring to FIG. 5, P defines a data waveform transmitted from the master controller (11) to the cell controllers (21, 31) of the inverters A, B (20, 30) through the CAN communication units (13, 14), where the data includes a synchronization signal and various pieces of command information. Q defines data (including output current of the power cell, a DC-link voltage and various pieces of trip information) of cell transmitted from the cell controllers (21, 31) to the master controller (11). R defines a signal of the inverter A (20) and S denotes a signal of inverter B (30). Furthermore, T and U are respectively waveforms enlarged of R and S.

An error may be generated on an output current due to hardware deviation even if PWM outputs of the inverters A, B (20, 30) are of the same output values, where the current detection unit (15) may provide to the master controller (11) by detecting a final output current (1) of the inverters A, B (20, 30). The master controller (11) may output a final PWM waveform by performing a PI (Proportional Integrate) control on two current errors. Thus, the present disclosure can reduce a circulating current that may be generated during parallel operation by minimizing the current errors.

Figure 6:
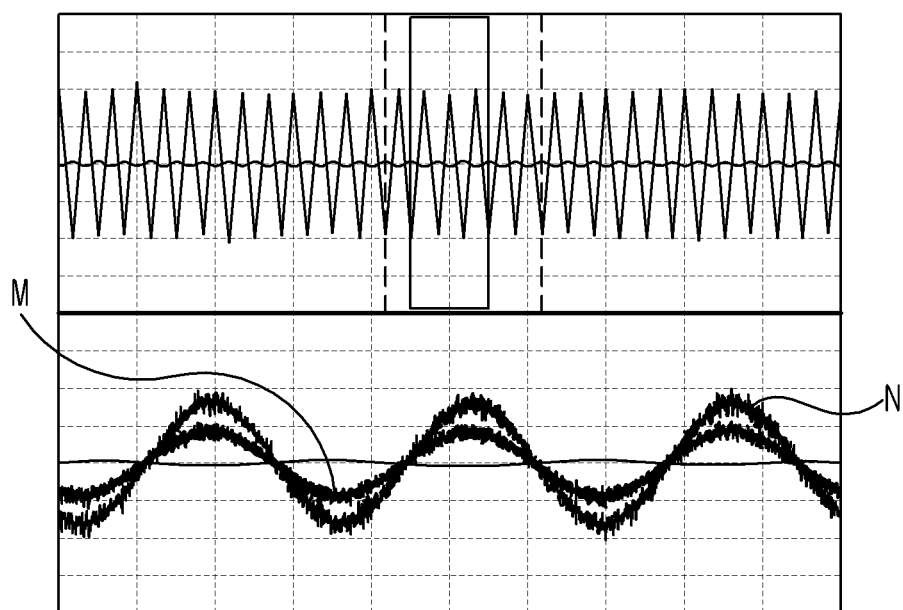
FIG. 6 is an exemplary view illustrating an output current waveform of an inverter system of FIG. 3.

FIG. 6 is an exemplary view illustrating an output current waveform of an inverter system of FIG. 3, where M denotes a current of each inverter (20, 30) and N represents a final current in which currents of inverters are summed up.

The present disclosure can solve the problem of the conventional paralleled inverter control fraught with degraded reliability and price increase through paralleled inverter operation using a single master controller (11).

That is, the present disclosure can perform a paralleled operation of a plurality of inverters without recourse to using separate hardware exchanging synchronization signals due to using a single master controller (11). That is, when a voltage command and an operation command are transmitted to the plurality of cell controllers (21, 31) using CAN communication units (13, 14) of the master controller (11), each cell controller (21, 31) can drive the power cells (22, 32) by generating PWM waveforms through its own computation.

At this time, an error may be generated on the output current due to hardware deviation despite the PWM output, and in this case, output currents of the inverters A, B (20, 30) are detected, and a PI control is performed on the current errors of two output currents to correct the voltage command and the operation command, whereby each of the cell controllers (21, 31) can output a final PWM waveform. That is, the present disclosure can reduce a circulating current that may be generated in the paralleled operation by minimizing the current errors.

Although the foregoing has explained and described a structure where two inverters A, B (20, 30) are connected in parallel, the present disclosure is not limited thereto, and the present disclosure may be applied to a paralleled structure of more than two inverters.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims

What is claimed is:

1. An apparatus for controlling at least two paralleled inverters, the apparatus comprising:
   a controller configured to correct operation information by performing proportional integral (PI) control with an error of output currents of the at least two paralleled inverters and transmit the corrected operation information to at least two interface units using a predetermined communication type via one synchronization signal using a controller area network (CAN); and
   a detection unit configured to detect output currents of each of the at least two paralleled inverters,
   wherein the at least two interface units are each configured to:
   transmit the corrected operation information to a corresponding one of the at least two paralleled inverters;
   convert an electric signal transmitted from the controller into an optical signal and transmit the optical signal to the corresponding paralleled inverter; and
   convert the optical signal received from the corresponding paralleled inverter to the electric signal and transmit the electric signal to the controller.

2. The apparatus of claim 1, wherein the operation information includes a voltage command and an operation command.

3. The apparatus of claim 1, wherein each of the at least two paralleled inverters includes:
   a plurality of cell controllers each configured to generate a pulse width modulation (PWM) signal in response to the corrected operation information; and
   a plurality of power cells, each connected to one of the plurality of cell controllers in order to generate a voltage that is provided to a motor in response to the PWM signal.

4. The apparatus of claim 3, wherein each of the plurality of cell controllers is further configured to transmit data from the corresponding power cell to the controller.

5. The apparatus of claim 4, wherein the data includes an output current of the corresponding power cell, a DC-link voltage and trip information.

* * * * *